US005308426A

United States Patent [19]

Claveau

[11] Patent Number: 5,308,426

[45] Date of Patent: May 3, 1994

[54] PROCESS OF DECORATION BY SUBLIMATION

[76] Inventor: Jean-Noël Claveau, Coisia, Arinthod, France, 39240

[21] Appl. No.: 977,019

[22] Filed: Nov. 16, 1992

[30] Foreign Application Priority Data

Nov. 26, 1991 [FR] France ............................... 91 14875

[51] Int. Cl.[5] ............................................... B32B 9/00

[52] U.S. Cl. ................................... 156/234; 156/235; 156/240; 156/277; 156/285; 156/286; 156/497; 428/195; 428/200; 428/202; 428/203; 428/204; 428/207; 428/913.3; 428/914; 8/471; 8/472

[58] Field of Search .............. 156/234, 235, 240, 277, 156/286, 285, 497; 8/471, 472; 428/200, 202, 914, 195, 913.3, 203, 204

[56] References Cited

U.S. PATENT DOCUMENTS

| | | | |
|---|---|---|---|
| 3,554,834 | 1/1971 | Bennett et al. | 156/210 |
| 4,021,591 | 5/1977 | DeVries et al. | 156/230 |
| 4,078,962 | 3/1978 | Kruegen | 156/286 |
| 4,314,813 | 2/1982 | Masaki | 8/471 |
| 4,314,814 | 2/1982 | Deroode | 156/234 |
| 4,997,506 | 3/1991 | Recher et al. | 8/471 |

FOREIGN PATENT DOCUMENTS

| | | | |
|---|---|---|---|
| 2203321 | 10/1974 | France . | |
| 8907530 | 8/1989 | PCT Int'l Appl. . | |
| 1363852 | 8/1974 | United Kingdom | 8/472 |

OTHER PUBLICATIONS

U.S. Patent Application S.N. 07/674,452 Filed Mar. 25, 1991 same as French Application 90.04488 referenced in specification.

*Primary Examiner*—Patrick J. Ryan
*Assistant Examiner*—Abraham Bahta
*Attorney, Agent, or Firm*—Dowell & Dowell

[57] ABSTRACT

A process for decoration of the surfaces of an object by sublimation of ink consisting in: using as a sublimable ink support a material which is sufficiently extensible and air-permeable so as to conform to the shape of the object to be decorated without adversely effecting the decoration to be sublimated, enveloping the object in the ink support, and placing the enveloped object in a vacuum machine which is introduced into a heated space to thereby cause transfer of the decoration to the object.

2 Claims, No Drawings

PROCESS OF DECORATION BY SUBLIMATION

BACKGROUND OF THE INVENTION

1. Field of the Invention

The present invention relates to a process for decoration by sublimation of an ink over the whole surface of an object, whatever its shape.

2. History of the Related Art

Applicant's previous U.S. patent application Ser. No. 07/674,422 filed Mar. 25, 1991 discloses a process for the transfer by sublimation of a drawing printed on a sheet of paper and a machine for carrying it out. Following various tests, it has been noticed that the decoration of objects of curved, spherical or ovoidal shapes brought about certain drawbacks when positioning the paper sheet. These drawbacks essentially reside in the fact that the paper sheet does not properly deform along its principal axes, this creating irregularities in the covering of the object by the paper sheet.

Such irregularities are due to the fact that the paper sheet creases or crumples when it is positioned in a vacuum around the object to be decorated. At the moment of sublimation, these creases are transferred onto the surface of the object, thus adversely effecting the quality of the drawing reproduced.

Such adverse effects include discontinuity of the decoration or offsetting portions of drawing with respect to one another.

In conclusion, the sheet of paper to be sublimated currently used in this process of decoration prevents objects of spherical, curved or ovoidal shapes to be treated satisfactorily.

It is a more particular object of the present invention to overcome this drawback.

SUMMARY OF THE INVENTION

The process according to the invention is characterized in that it consists:

in using as ink support a material which is sufficiently extensible air-permeable to be able to conform to the shape of the object to be decorated without risk of adversely effecting the decoration to be sublimated:

in enveloping the object in the sublimable ink support so that all its surfaces are covered:

in placing the assembly in a vacuum machine, known per se, which is introduced into a heated space to cause transfer of the decoration over the whole surface of the object to be decorated.

The process of decoration according to the invention is carried out using an ink support made of an extensible air-permeable material such as for example a woven fabric, knitted fabric or sheet of non-woven material.

This extensible material is coated on one of its surfaces with a sublimable ink representing the decoration to be transferred. The object, of any shape, is enveloped in the extensible material so that the ink-coated face is directly in contact with the surfaces of the object to be decorated. In this way, when the object included curved or spherical shapes, the extensible material extends along its geometrical axes so as perfectly envelop the surface of the object. The extensible material is applied without folds or creases on the object when the sublimating machine a described in Applicants' aforementioned application is placed in a vacuum.

After sublimation, it is noted that the transfer of the decoration on the curved, spherical or ovoidal surfaces of the object is remarkably regular and constant.

What is claimed is:

1. A process for decoration of the surfaces of an object by sublimation of ink, comprising the steps of:

using as a sublimable ink support a material which is extensible and air-permeable so as to conform to the shape of the object to be decorated without altering the decoration to be sublimated:

enveloping the object in the ink support so that all its surfaces are covered; and placing the assembly in a vacuum machine, which is thereafter introduced into a heated space to cause transfer of the decoration to all the surfaces of the object to be decorated.

2. A sublimable ink support for carrying out the process of claim 1, wherein the ink support is selected from a group of materials consisting of a woven fabric, a knitted fabric, and a non-woven material.

* * * * *

US005308426B1

(12) REEXAMINATION CERTIFICATE (4451st)

United States Patent

Claveau

(10) Number: US 5,308,426 C1

(45) Certificate Issued: Oct. 9, 2001

(54) PROCESS OF DECORATION BY SUBLIMATION

(75) Inventor: Jean-Noël Claveau, Arinthod (FR)

(73) Assignee: Kolorfusion International, Inc., Englewood, CO (US)

Reexamination Request:
No. 90/005,714, Apr. 28, 2000

Reexamination Certificate for:

| | |
|---|---|
| Patent No.: | **5,308,426** |
| Issued: | **May 3, 1994** |
| Appl. No.: | **07/977,019** |
| Filed: | **Nov. 16, 1992** |

(30) Foreign Application Priority Data

Nov. 26, 1991 (FR) .................................................. 91 14875

(51) Int. Cl.$^7$ ............................... B44C 1/175; B32B 9/00

(52) U.S. Cl. .......................... 156/234; 156/230; 156/234; 156/235; 156/240; 156/277; 156/285; 156/286; 156/497; 428/195; 428/200; 428/202; 428/203; 428/204; 428/206; 428/207; 428/542.2; 428/913.3; 428/914; 8/471; 8/472

(58) Field of Search .................................... 428/195, 200, 428/206, 202, 207, 204, 913.3, 914, 542.2, 203; 156/240, 234, 277, 235, 285, 286, 230, 497; 8/471, 472

(56) References Cited

U.S. PATENT DOCUMENTS

| | | | | |
|---|---|---|---|---|
| 4,323,601 | * | 4/1982 | McMillan et al. .................. | 427/287 |
| 4,670,084 | * | 6/1987 | Durand ................................ | 156/540 |
| 5,798,017 | | 8/1998 | Claveau . | |
| 5,893,964 | | 4/1999 | Claveau . | |

FOREIGN PATENT DOCUMENTS

| | | | |
|---|---|---|---|
| 0129023 | * | 12/1984 | (EP) . |
| 1376108 | * | 12/1974 | (GB) . |
| 1410703 | * | 10/1975 | (GB) . |
| 1410703 | | 10/1979 | (GB) . |
| 89/07530 | * | 12/1984 | (WO) . |

* cited by examiner

*Primary Examiner*—Deborah Jones

(57) ABSTRACT

A process for decoration of the surfaces of an object by sublimation of ink consisting in: using as a sublimable ink support a material which is sufficiently extensible and air-permeable so as to conform to the shape of the object to be decorated without adversely effecting the decoration to be sublimated, enveloping the object in the ink support, and placing the enveloped object in a vacuum machine which is introduced into a heated space to thereby cause transfer of the decoration to the object.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–2 is confirmed.

* * * * *